United States Patent [19]
Champlin

[11] Patent Number: 4,672,879
[45] Date of Patent: * Jun. 16, 1987

[54] SHAPED MECHANICAL COMPRESSION PACKING

[75] Inventor: George B. Champlin, Stoneham, Mass.

[73] Assignee: Seal Company of New England, Manchester, N.H.

[*] Notice: The portion of the term of this patent subsequent to Nov. 5, 2002 has been disclaimed.

[21] Appl. No.: 794,165

[22] Filed: Nov. 1, 1985

Related U.S. Application Data

[63] Continuation-in-part of Ser. No. 450,517, Dec. 17, 1982, Pat. No. 4,550,639.

[51] Int. Cl.$^4$ .......... D04C 1/06; D04C 1/12; F16J 15/22; F16J 15/26
[52] U.S. Cl. .......... 87/7; 87/1; 87/5; 87/8; 87/11
[58] Field of Search .......... 87/1, 5–8, 87/11

[56] References Cited

U.S. PATENT DOCUMENTS

| | | | |
|---|---|---|---|
| 2,360,106 | 10/1944 | Buhler | 87/6 X |
| 2,667,684 | 2/1954 | Boyer et al. | 87/1 X |
| 2,716,034 | 8/1955 | Main | 87/1 |
| 2,827,319 | 3/1958 | Pearce | 87/6 |
| 3,646,846 | 3/1972 | Houghton et al. | 87/1 |
| 4,550,639 | 11/1985 | Champlin | 87/7 |

Primary Examiner—John Petrakes
Attorney, Agent, or Firm—Robert K. Tendler

[57] ABSTRACT

A non-symmetrical construction of braided mechanical compression packing which includes warp yarns removed from the inner corners to prevent "popping" of these yarns during manufacture or when the packing is wrapped about a shaft. Additionally, a number of embodiments involving interior space filled with varying numbers of warp yarns at different positions produce an optimal warp density gradient in the finished braid, such that the braid has a more regular trapezoidal cross-section prior to being wound about a shaft, with the higher density occurring at the outside of the packing and tapered in density toward the inside of the packing. This non-symmetry of construction results in longer packing life and reduced shaft wear when used to prevent leakage about rotating shafts.

6 Claims, 16 Drawing Figures

SHAPED MECHANICAL COMPRESSION PACKING

CROSS-REFERENCE TO RELATED APPLICATION

This application is a continuation-in-part of applicant's co-pending patent application, Ser. No. 450,517, entitled SHAPED MECHANICAL COMPRESSION PACKING, filed Dec. 17, 1982, now U.S. Pat. No. 4,550,639.

FIELD OF INVENTION

This invention relates, in general, to mechanical compression packing for controlling leakage about shafts, and in particular, to packing which does not undergo undesired deformation when placed under load in normal use.

BACKGROUND OF THE INVENTION

Because there is a wide variety of applications for mechanical packing and seals, including packing for pumps, valves, hydraulic, and pneumatic equipment, a whole industry has grown up in their design and construction. In the areas with which the present invention is concerned, the packing is generally sold in relatively long coils of braided packing material of square or rectangular cross-section from which many suitable lengths may be cut. Conventionally, several lengths are cut from the coil of material for a given installation, each length being formed into a ring about a shaft with the cut ends abutting each other. Often, as many as a half dozen such rings or more are disposed about the shaft with their radial sides in abutting relationship.

A so-called packing or stuffing box formed integrally with, and generally extending outwardly from, the housing surrounds the shaft. The interior of the stuffing box is of a diameter sufficiently greater than that of the shaft to accommodate the packing rings. An annular gland is fitted about the shaft and bolted to the exterior of the stuffing box in such a fashion that an end of the gland compresses the packing rings in the stuffing box. Generally, the gland has a flange through which bolts pass which are threaded into the stuffing box. Tightening of the bolts pulls the gland toward the housing and thereby compresses the packing rings within the stuffing box. Under such compression, the materials tend to expand radially to some extent and substantially fill the stuffing box to prevent or minimize the escape of the contents of the housing at the intersection of the shaft and the housing.

In the original conventional manufacture of the packing material, it is braided in the form of a relatively long, straight length with square or rectangular cross-section. Because it is then cut to desired short lengths, each of which is formed into a ring about a cylindrical shaft, the outside circumference of each packing ring is longer than the inside circumference. Before compression from the gland is applied, the cross-section of each ring tends to form itself into a trapezoidal shape, the narrow side of the trapezoid being the stretched side adjacent the inner surface of the stuffing box. Conversely, the wide side of the trapezoid abuts the shaft. Because of the trapezoidal cross-section which is assumed by each packing ring, this phenomenon is known as "keystoning."

Several problems arise from this keystoning effect. First and foremost, when a plurality of abutting rings are used in a typical application and the packing is compressed by the gland, the force exerted by the gland is concentrated on the packing ring corners adjacent the shaft. This creates a higher normal force between the corners of the packing rings and the shaft adjacent thereto than is created along the ring at locations remote from the corners.

Moreover, wear of both packing and shaft becomes more rapid at these corners adjacent the shaft and foreshortens the usable life of both the packing ring set and shaft and reduces the time before leakage becomes intolerable, necessitating adjustment of gland compression and subsequent replacement of the packing and shaft in a shorter than desirable time.

More specifically, most mechanical compression packing is formed on plait or so-called "lattice" braiding machines, e.g., interlocking braiding machines, by braiding yarns from moving yarn carriers about axial warp yarns in such a fashion that the warp yarns provide fill which is symmetrical about the central axis of the finished braid. Said otherwise, the warp yarns, when viewed cross-sectionally, are conventionally the same in number and by position when any 90-degree quadrant of a cross-section of the packing is viewed in mirror image compared to the adjacent two quadrants. The cross-section of the conventionally braided packing has a square or rectangular shape when a length of the material is placed on a flat surface, and the opposite sides of the square or rectangle are generally parallel and equal in width.

However, when measured lengths of material are wrapped about a cylindrical body, such as a pump sleeve or valve shaft, to form rings with outer sides abutting the inner surface of a stuffing box, the outer sides are placed under some circumferential tension. As a result, each ring's outer side, i.e., the side adjacent the interior of the stuffing box, tends to contract in the direction parallel to the axis of the ring before the rings are compressed by the gland. Also, the inner side, i.e., the side adjacent the surface of the shaft, tends to expand in length in the direction parallel to the ring axis. When the rings are compressed, more of the load is directed axially to the inner portion of the packing rings adjacent the shaft. The force is concentrated at the abutting inner corners of the rings, and this results in unwanted wear.

Various alternatives have been proposed to combat the unwanted effects of keystoning. One alternative involves the use of packing rings which are interspersed with compensating rings machined or die-formed into wedge shapes having the wider axial dimension at the outer diameter. The packing rings are then installed in proper sequence with the "wedge spreaders" to compensate for keystoning. This expedient is useful and has provided some relief from sealing problems, but it is expensive and requires special forms of packing rings and wedges which must be carefully assembled and installed in the proper order.

Moreover, in the past there has been a problem when trying to pack rings of small cross-section such as those in the one-quarter inch to the five-sixteenths inch range about relatively small diameter shafts of one-half to one and three-eighths inches. The problem is that when the packing is wrapped around the shaft, the warps which are at the interior corners tend to pop out and result in shaft scarring. This can occur either before or after gland pressure is applied. Moreover, warp popping can occur in manufacture when these small cross-section braids are drawn off the braiding machine around a capstan.

As will be appreciated, the popping problem relates to certain particular materials used in the construction of the braided packing. If a material of high strength and relatively low yield is used in the construction of the packing, then the yarns used as the corner fill on the inside of the packing, the side which will be placed adjacent the shaft, will tend to "pop" out through the braided outer layer, as there is a resistance to their compressing axially within the braid. Thus, the inner axial corner yarns tend to deform to the side instead of remaining constrained within the braid. This "popping" occurs because a high intensity point load is placed upon the braid when the braid passes over a radiused surface and results in what appears to be a loop of axial yarn outside the braid. Examples of packing materials which have this tendency are Kevlar IT aramid packing yarn which is a plied aramid monofilament yarn impregnated with Teflon, i.e., polytetrafluorlethylene, and treated with silicone, i.e., dimethylsiloxane, manufactured by E. I. DuPont Company, and graphite filament yarn cordage which may or may not contain various sizings, finishes or treatments manufactured from plied and twisted rayon monofilament precursor yarns or spun, twisted and plied "pitch" based graphite yarns as manufactured by the Polycarbon Company.

When packing containing these yarns "pops" during manufacture, or when the "pops" are created as result of placing the packing in the stuffing box, if the "pop" becomes located between the packing and the shaft or shaft sleeve, then a local high intensity point load is placed upon the shaft surface as a result of this "popped" warp. This results in much higher than normal wear on the shaft or shaft sleeve and has resulted in wear so high that one can see evidence in worn sleeves in which the cuts resemble those made by a machine tool operating on the surface of a rotating shaft.

While the popping problem is particularly severe for packings used about small diameter shafts, popping is also a problem in packing made with these materials for use on larger shafts. It is therefore a primary objective of the present invention to prevent such "warp pop-out" so as to protect shafts from scarring.

It is also an object of this invention to provide a tapered density profile for the packing ring which better eliminates the aforementioned "keystoning" effect when the packing ring is wrapped around a shaft and is compressed by providing a more regular initial trapezoidal cross-section.

Another object of the present invention is to avoid the use of packing rings and wedges or preshaped cross-sections which must be assembled in a particular sequence.

Still another object of the invention is to avoid the need of packing rings which are die-formed so that they are preshaped to fit the stuffing box.

A further object of the invention is the production of mechanical compression packing which is not subject to either keystoning or warp popping.

SUMMARY OF THE INVENTION

The problems of keystone-induced leakage and warp popping are solved in the subject invention respectively by providing an optimal warp density gradient and by removal of inner corner warps, with these techniques being used either in combination or separately.

In the present invention, mechanical compression packing is braided in such fashion that elimination or reversal of the keystoning effect in the installed rings is improved due to an optimal warp density gradient which produces an optimal trapezoidal cross-section for the packing such that the packing is provided with straighter sides. Such an effect is achieved not only by the use of additional warp fill in the outer corners of the braid, but also by tailoring the numbers or density of warps through the interior of the packing to provide an optimal density gradient.

While the keystoning effect may be alleviated by the utilization of different numbers of warp yarns in the outer corners of the ring vis-a-vis the inner corners of the ring, the trapezoidal cross-section is optimized by a gradient profile for the warp yarn fibers in which a higher density or number of warp yarns exists towards the outer edge of the ring. This gradient may be achieved by varying the number of warp fibers at the interior positions on the packing braiding machine.

The resulting trapezoidal-shaped packing, when viewed straight, is desirable in combatting the keystoning effect such that when the packing material is wrapped around a shaft and compressed, it tends to form a rectilinear cross-sectional shape with straighter abutting sides that form an improved seal from ring to ring.

Thus, when a length of packing is measured and cut to form a ring about a shaft, the added material toward the outer surface resists shrinkage in the axial direction of the packing ring while the less dense inner surface tends to expand in the axial direction in a smaller than normal amount. Opposite sides of the rings thus tend to become parallel, and radial sides abut each other closely and uniformly, distributing the gland load more evenly throughout radial sides of the rings and creating a seal of high integrity as well as lengthening the life of the shaft and the packing. By tailoring the interior warp density or structure, an ideal density gradient can be achieved which more perfectly counteracts keystoning and makes the sides of the rings even more parallel when the rings are compressed by the gland when compared to rings cut from conventionally braided packings.

More specifically, it has been common that all of the warp yarn positions which are used contain yarns that are of the same density or the same number for a given warp position within the braided packing and that the yarns are used in a symmetrical fashion at respective warp positions in any 90° quadrant within the braid when viewed cross-sectionally. This contributes to an initial rectilinear cross-section for the ring which when compressed causes keystone-induced pressures as mentioned before. It is the purpose of the present invention to provide differing numbers of warp yarns at different interior positions of the braid, which, when used, preferably vary in density and/or number, starting with the most dense at the outside edge of the braid and decreasing in density or number as the positions approach the inside edge of the ring. This may be accomplished in a number of ways, with an optional requirement that there be symmetry about a vertical axis when viewed cross-sectionally through the center of the packing ring.

Another way of understanding this portion of the subject invention is that there is an unbalanced symmetry about a horizontal line going through the center point of the braid cross-section, such that the number of warps at corresponding interior warp positions above the center line are larger in number or have more density than those used in the corresponding warp positions below the horizontal center line of the braid cross-section.

In addition to the elimination of keystoning by the provision of the above-mentioned warp density profile, the subject invention also includes popping prevention, especially in braid used about small diameter shafts. Popping is prevented in smaller braids, or indeed in any braid, by the removal of warp yarns from the inner corners of the braid adjacent the shaft. In this case, warp yarns are removed from the inner corners, or "A" positions as will be described later, and are placed at the interior "B" positions. This removes the warps from the corners. Additionally, the warps which do exist in the "B" positions, near the corners but not at the corners, may be less dense or have fewer yarns than those at the outer corners to effectuate a more perfect initial trapezoidal cross-section. In other words, lesser numbers or warps may be used at these "B" positions than in the corresponding positions on the outer side of the packing.

By virtue of the removal of the warp yarns at the inner corners of the ring, there are two layers of braided material from yarn carriers between warps at the "B" positions and the inner corner of the packing. This additional amount of braid material prevents popping of the warps when the packing traverses any radiused surface, especially the surface of a small diameter shaft. Therefore, this technique eliminates the aforementioned scoring due to braid popping, whether the popping occurs during manufacture, during shaft wrapping, or during compression.

For a better understanding of the invention, together with other features, objects, and advantages, there follows a description of a preferred embodiment which should be read with reference to the attached drawings in which:

DETAILED DESCRIPTION

Figure 1A:
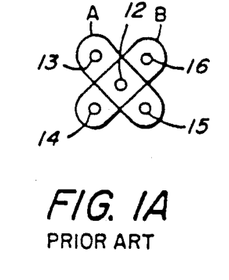
FIGS. 1A–1C illustrate schematically cross-sections of braided compression packing of the prior art.

In FIG. 1A, there is illustrated in cross-section a conventional plait or "square" pattern composed of a central core position 12 and axial warp yarn positions 13, 14, 15 and 16 used to provide fill in the packing material. In some instances, the central core 12 is not utilized. However, in either case, each of the warp yarns has yarn from moving carriers, typically eight in number, braided about it, the path of the carriers being represented by A, B. As is obvious from the drawing, in any 90-degree quadrant of the packing cross-section, the axial warp yarns, when used, are the same numerically and by position.

Figure 1B:
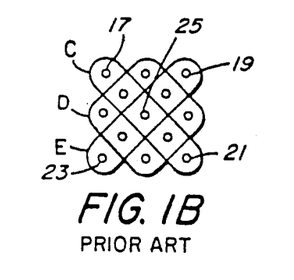

In FIG. 1B, a similar cross-section of a packing material is shown. In this instance, however, a 20-carrier interlocking or so-called "lattice" pattern is shown with the maximum number of warp positions. Each of the warp yarn positions, of which yarns in warp positions 17, 19, 21 and 23 are typically always used and customarily have yarns equal in number or density in each position, has yarn from carriers following paths in the braider deck C, D, E braided about it. A central core 25 may or may not be used. However, a structure is formed in which, in either case, the axial warp yarns which constitute the fill are the same in number and by position in any 90-degree quadrant when viewed in mirror image with respect to each of the two adjacent quadrants.

Figure 1C:
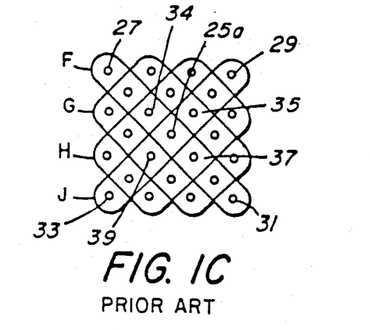

Still another pattern is shown in FIG. 1C. Here, a 36-carrier interlocking or so-called "lattice" pattern is shown with the maximum number of warp positions. Each of the warp yarn positions, of which yarns in positions 27, 29, 31 and 33 are typically always used and yarns in positions 34, 35, 37, 39 are frequently used, has braided about it and the central core 25a, if used, yarns from carriers following paths F, G, H, J in the braider deck to form a structure in which the axial warp yarns which constitute the fill are symmetrical in the sense that they are the same in number and by position in any 90-degree quadrant when viewed in mirror image relative to either adjacent quadrant. The structures illustrated are only three of a variety of patterns which may be used. The technique of "lattice" braiding is well known in the industry, and patterns of three, four or five tracks have been composed. What all of the patterns, as presently braided, have in common, however, is symmetry of warp yarn fill used in any one quadrant when viewed in mirror image with each of the two adjacent quadrants.

Figure 2:
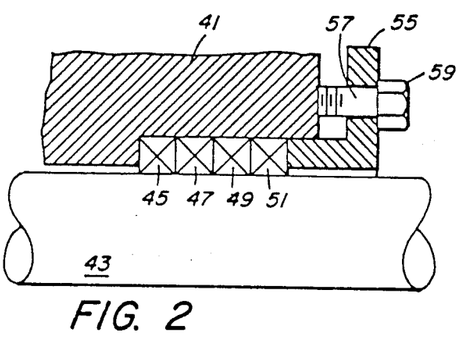
FIG. 2 is an illustration, partly in section, of a shaft passing through a stuffing box with a seal formed of four packing rings which are compressed by a bolted gland.

FIG. 2 is a representation in partial cross-section of an ideal packing arrangement. Shown fragmentarily and partly in section is a containment structure 41 which constitutes a stuffing box. Passing through the stuffing box to the interior of the container (not shown) is a cylindrical shaft 43. The shaft, depending upon the application, may run from a source of power and support bearing (not shown) at the right as seen in FIG. 2 to an impeller (not shown) at the left as seen in FIG. 2. Packing rings 45, 47, 49 and 51 are shown in the positions which they occupy to control leakage of material. As shown here, the interior of the container would be at the left, and leakage to the exterior would be to the right through the intersection of the stuffing box 41 and the shaft 43. A gland 55, conventionally formed as a flanged annulus, is provided. A series of openings is formed in the flange parallel to the gland axis. Bolts, such as bolt 57, are passed through the opening and threaded into the end of the stuffing box 41. The bolts are tightened with the object of causing the bolt heads (as at 59) to bring pressure uniformly upon the gland and thus the packing rings.

Figure 3:
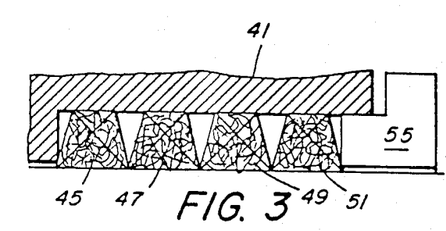
FIG. 3 illustrates the keystoning of four packing rings of the prior art in the stuffing box before compression by the gland.

In practice, however, the idealized situation shown in FIG. 2 is not achieved with packing rings of the prior art. As has been described above, wrapping of the packing rings about the cylindrical shaft causes the keystoning phenomenon to occur. FIG. 3 illustrates the keystoning effect. In FIG. 3, each of four packing rings 45-51 will be seen to have assumed a trapezoidal cross-sectional shape. This occurs prior to any compression being applied to the rings by the gland 55 and, in fact, on individual rings prior to die-forming if such a technique is employed.

Figure 4:
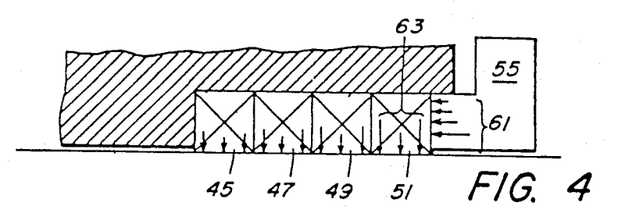
FIG. 4 illustrates the loading effect upon the shaft caused by keystoning of four packing rings after compression by the gland.

In FIG. 4, the loading effects caused by keystoning are illustrated. Pressure from the gland 55 is greatest upon the wider inner sides of the four packing rings as represented by the arrows 61 which denote a pressure gradient. The forces upon the packing rings are such that the greatest loading is exerted upon the shaft adjacent the inner lower corners of each of the packing rings, illustrated by the arrows 63 which represent force. Under such conditions, wear of the packing rings as well as the shaft is most rapid at the points of greater force.

Figure 5:
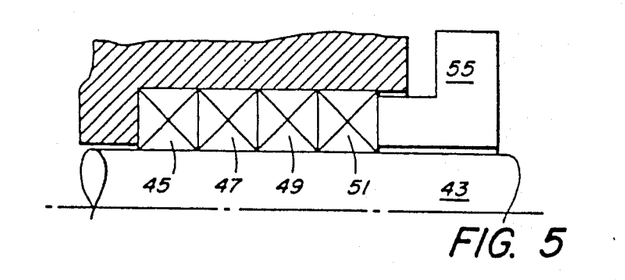
FIG. 5 illustrates four installed packing rings braided in accordance with the present invention before compression by the gland.

In FIG. 5, the effect of the non-symmetrical braiding on four packing rings cut from braided mechanical packing made in accordance with the present invention is shown. Neither before nor after compression does keystoning exist. The packing rings 45-51 maintain a cross-section in which opposite sides remain parallel despite the wrapping of the rings about the shaft 43. Sides of the rings parallel to the axis abut each other uniformly and closely.

Figure 6:
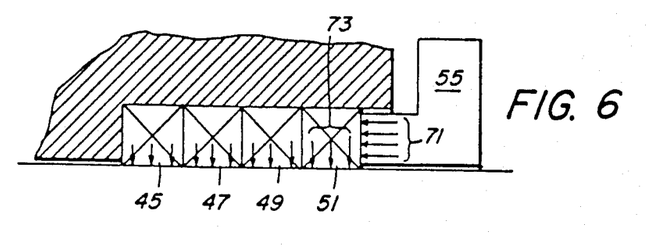
FIG. 6 illustrates the loading effects achieved in the present invention after compression by the gland.

In FIG. 6, the loading effects on the non-symmetrical braided packing rings are illustrated. Because of the parallel close abutment of the packing rings with one another and with the end of the gland 55, forces exerted by the gland parallel to the axes of the shaft and packing rings are equal as represented by the arrows 71. These forces are translated into equalized loading effects of each of the packing rings 45-51 upon the shaft 43, as indicated by the arrows 73 which represent a pressure gradient. As has been noted, the non-symmetrically braided mechanical packing creates a packing ring in which the opposite cross-section sides are essentially parallel when the packing ring is installed.

Although there is a vast number of applications for mechanical packing, there has been some effort made toward standardization of dimensions in the industry. Mechanical packing of any given cross-section dimension is commonly provided for use with a range of shaft diameters in which the variation in diameter is approximately 40% for pump shafts. The placement of warp fill in mechanical packing made in accordance with the present invention is preferably such that essential parallelism of the opposite sides of the installed packing ring occurs at or near the minimum shaft diameter for which the cross-section is intended. Elimination of the keystoning results in a more uniform, normal load being applied between the packing rings and the shaft. In addition to superior leakage conrol, the usable life of the packing rings and the shaft is considerably extended.

Figure 7:
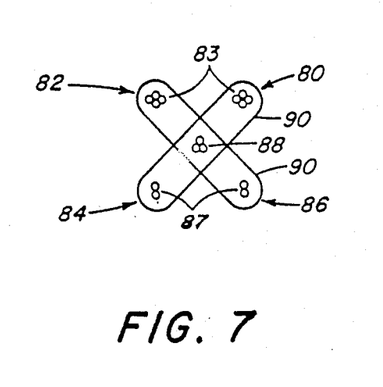
FIG. 7 is a schematic illustration of a cross-section of braided compression packing made in accordance with the subject invention.

Referring now to FIG. 7, a schematic diagram illustrates in cross-section one embodiment of a braided compression packing in which corners 80 and 82 have greater amounts of warp fill 83 than do the lower corners 84 and 86 as illustrated at 87. This differential in the amount of cornerfill between the inner and outer edges of the packing may be provided by differing numbers of warp yarns or in any other fashion so as to vary the amount of cornerfill to eliminate keystoning. Thus, in one embodiment, the reversal of the keystone effect is provided by the use of a simplified density gradient technique in which additional fill is used in the outer warps. Central core warps 88 or internal warps, if used, in one embodiment can differ in number, and thus the amount of material, from that associated with the corners. As before, additional yarns are braided about the axial warp yarns along a path generally indicated by 90.

RING PACKING FOR A SMALL DIAMETER SHAFT

Prior to describing an optimal density gradient for the warp fibers, even if the above simple density gradient were achieved by differentials in the corner warps, warp popping can nonetheless occur, especially for small packing rings used for small diameter shafts. Prevention of warp popping, both in conventional braid and braid having increased warp densities in the outer corners, is described in connection with FIG. 8.

Figure 8:
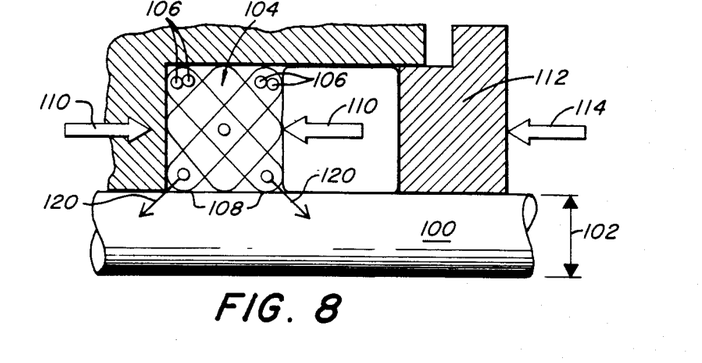
FIG. 8 is a diagrammatic illustration of the utilization of a packing ring in which popping occurs due to the popping out of the warps adjacent the inner corners of the ring.

Referring now to FIG. 8, a small diameter shaft 100 is illustrated as having a diameter illustrated by 102 to be on the order of one-half inch to one and three-eighths inches. The packing ring generally has a small cross-section of one-quarter to three-eighths inches, although the subject invention is not limited to small diameter shafts or small packing cross-sections. The subject invention, as illustrated in cross-section at 104, shows generally that there are larger numbers of warps 106 at the outer corners than the number of warps at the inner corners 108. When the packing rings are wrapped around the shaft, the packing assumes the aforementioned rectilinear cross-section. The rings may be compressed in the direction of arrow 110 due to the movement of gland 112 in the direction illustrated by arrow 114.

However, when certain packings are caused to bend around a radiused surface such as a capstan or a small diameter shaft, warps at corners 108 can pop out of the braid at the corners as illustrated by arrows 120. The popping problem is particularly severe when the packing material has high tensile strength to resist the deformation desired by the braid.

While popping can occur when the packing is wound about a shaft, it can also occur during manufacturing or shipping. This is especially true for Kevlar one-quarter inch braid, in which popping can occur during the braiding process if adequate axial tension is not maintained at the corner of the braid as it is manufactured.

For instance, the popping can occur when the finished braid passes over the capstan used in drawing off the finished braid such that the corner warps nearest the capstan surface pop out as the braid bends around the capstan. Popping can also occur during subsequent handling, such as when the braid is coiled for shipment.

Figure 9:
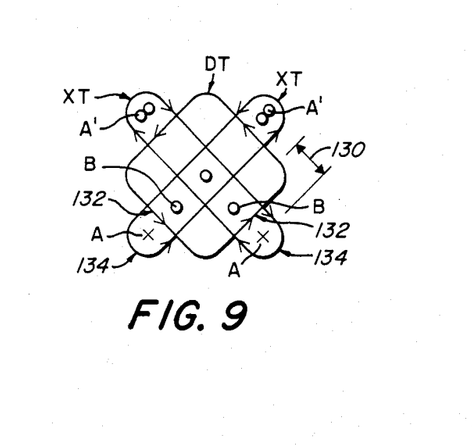
FIG. 9 is a diagrammatic illustration of one type of braid illustrating the removal of warps at the "A" positions which are at the interior corners and the provision of warps at the "B" interior positions, with the density or number warps at the "B" positions being less in number or density than the number or density of warps at the "A" positions at the outer corners.

The problem of popping is solved by removing the warps at the inner braid corners. This is shown in FIG. 9 in which warps are removed from the "A" positions as indicated by an "X," which refers to the absence of any warp fibers at this position. Rather, interior warp yarns are provided at the "B" positions, so-called, which B warps, in a preferred embodiment are lesser in number or density than the number or density of the warps at the A' positions which are at the outer corners of the packing ring.

Whether conventional braid is used, or whether braid which has a tapered density is used, the elimination of warp yarns at the "A" positions or the positions at the inner corners permits the utilization of Kevlar and pure graphite filaments for shaft applications of relatively small diameter. The advantage of the above is that instead of having to exercise a great deal of control over the inner corners to prevent the popping out of the warps, having warps at the "B" positions as opposed to the "A" positions eliminates the popping problem while, at the same time, maintaining good parallelism of the sides of the adjacent rings when the packing is wrapped about the shaft in the form of a ring.

The subject system is applicable to high temperature valves because a preferred material for high temperature values is pure graphite filament which tends to pop out at the inner corners of the braid if the graphite filament were to be utilized as a warp strand at the "A" position. When it pops through the braid, it puts a very high point load on the shaft and provides a leak path adjacent the "pop." This results ultimately in failure of the valve packing.

More importantly, as to pumps, scoring of pump shafts by popped warp fibers is completely eliminated with elimination of warp fibers at the "A" positions, and this permits the use of Kevlar braid. It will be appreciated that Kevlar braid is used in pump applications to eliminate the use of asbestos because it can be made to perform like asbestos. The problem with Kevlar is that the fibers tend to have popped at the inner corners making the above substitution impractical due to higher shaft wear than with asbestos.

In accordance with the subject invention, by removing warp yarns from the "A" positions, the Kevlar braid can be substituted for the more carcinogenic asbestos. Thus, in pumps with small shaft diameters, packing braided from Kevlar IT packing yarn or other high-yield strength, low-stretch materials can be made without the popping associated with these materials. Moreover, packing and sleeve life can be extended by eliminating the machining tool scoring action of the popped warp yarns on the pump shaft or sleeve.

As can be seen from FIG. 9, the distance from the first interior "B" position to the inner corner "A" position is illustrated by double arrow 130 and is the sum of the thickness of the carrier yarns used on "XT" and "DT." It will also be appreciated that in an interlocking braiding machine, at least two portions of braid, here labeled 132 and 134, are positioned between the inner surface or edge of the packing ring and the warp fibers at position "B." This prevents the aforementioned popping and therefore scoring of the associated shaft. Note that in FIG. 9 the weave corresponding to the "diamond" track is labeled "DT" and is woven in the area indicated by the associated arrows, whereas the remaining tracks are called the "X" tracks and are woven in the direction of the associated arrows.

What can be seen in summary is that by leaving a double layer of braid between the "B" position and the inside corner where there would normally only be a single layer of material, warp popping is prevented. Of course, for further protection, depending upon the type of braiding machine utilized, the warps adjacent the interior corners may be moved further inwardly, although this is usually not necessary.

Figure 10A:
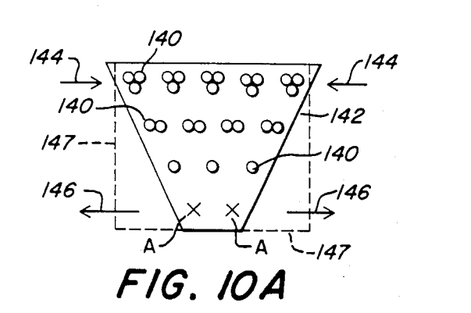
FIGS. 10A, 10B and 10C are illustrations of preferred density profiles for the warps in which the outer warps are more dense than the inner warps.
Figure 10B:
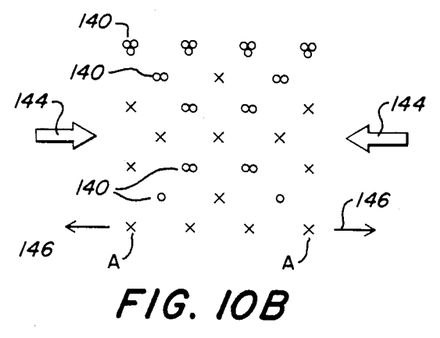
Figure 10C:
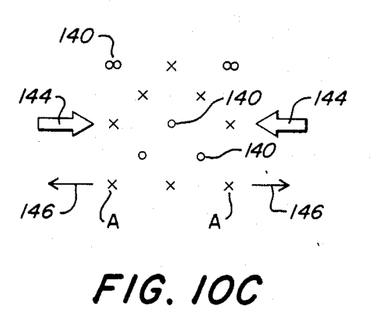

The absence of warps adjacent the inner corners may be used in conventional rings or may be utilized in a gradient density type of braid which initially provides a trapezoidal cross-section, with preferred gradients being illustrated in FIGS. 10A, 10B and 10C.

PREFERRED GRADIENT

As mentioned above, a non-symmetrical gradient can be achieved by merely increasing the number or density of warps in the outer corners of the braid. This results in a rough trapezoidal cross-section which, when wrapped about a shaft, produces rectilinear sides to combat keystoning and consequent leakage. While this approach works quite well, tailoring the interior warp densities provides better trapezoidal cross-sections and better-fitting straight sides. Different types of interior warp profiles are illustrated in FIGS. 10A–10C.

Referring now to FIGS. 10A, B and C, a number of warp fibers are illustrated by circles 140, with a greater number of circles indicating a greater number of warps or greater density. The preferred packing ring shape is shown in FIG. 10A by trapezoid 142 and is the cross-sectional shape of the braid prior to its being wrapped around and compressed about a shaft. Here it can be seen that the "A" positions are devoid of warps, which is a preferred embodiment and is not necessary for large diameter shafts, although leaving the "A" positions vacant can be of advantage, even for large cross-section packings used for large diameter shafts.

As mentioned before, with wrapping of the packing ring about a shaft, the top portion of the ring moves inwardly as illustrated by arrows 144, and the bottom portion or inner portion of the packing ring moves outwardly as illustrated by arrows 146, thereby giving a rectilinear cross-sectional configuration to the ring as illustrated by dotted line 147.

FIGS. 10B and 10C illustrate density gradients for braid which has been manufactured and tested, with the braid thus manufactured exhibiting increased leakage resistance. FIG. 10B represents a preferred embodiment for a 36-carrier machine, whereas FIG. 10C represents a preferred embodiment for a 20-carrier machine.

Figure 11:
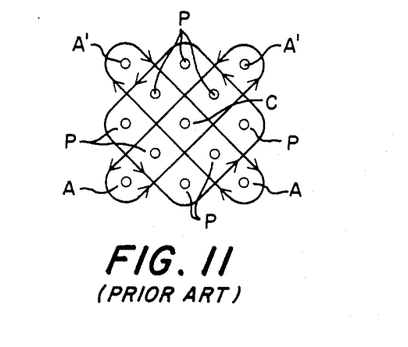
FIG. 11 is a diagram of a prior art warp and braid structure in which, when all interior warp positions are used, they are symmetrical in use, with each position having equal numbers of warp fibers or equal densities.

Referring now to FIG. 11, in the prior art, interior points P were sometimes filled with fibers or not; but in any event, the number of fibers at any given position matched the number of fibers at any other position. Thus, in the prior art, all warp fibers were equal in number, regardless of what position they were in. Again, what is shown in FIG. 11 is a diamond weave.

Figure 12:
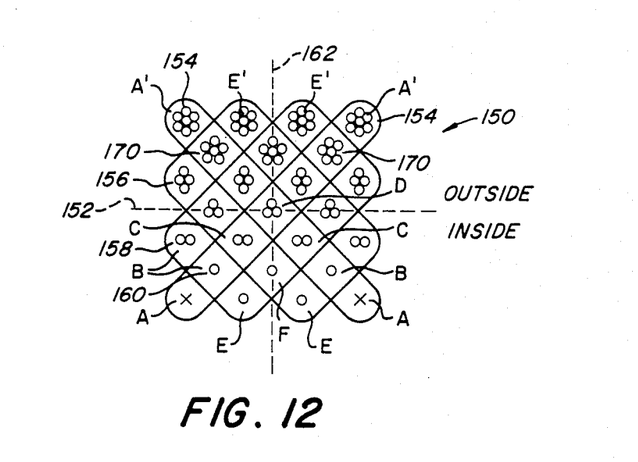
FIG. 12 is a diagrammatic illustration of a weaving structure in which there is a density or warp number gradient from the outside of the packing ring to the inside.

Referring now to FIG. 12, an interlocking braid weave is illustrated cross-sectionally at 150 with different densities or different numbers of warp fibers providing a density gradient which decreases from the outside, as delineated being above line 152, as opposed to those fibers being to the inside, which are below line 152. Line 152 is a horizontal line running through the center, D, of the packing ring. It will be noted that the number of fibers 154, 156, 158 and 160 are graded so that there is asymmetry about line 152. However, there is line symmetry about vertical line 162 running through center point D such that when woven, the braid takes on the preferred anti-keystoning trapezoidal cross-section configuration.

It should be noted that trapezoidal braids have been made by extrusion for purposes of wiping oil from steel in mills but never for sealing, and the trapezoid being the final shape rather than the initial shape. What the configuration of FIG. 12 accomplishes is an optimal initial trapezoidal configuration for the packing which, when wrapped about a shaft, provides for improved sealing due to an improved rectilinear cross-section which is extremely useful in preventing leaking, since adjacent rings have sidewalls which are even more parallel one to another than those rings having no interior gradient.

While the density gradient illustrated in FIG. 12 represents a certain amount of symmetry about point D as well as line symmetry about line 162, other warp densities or numbers are within the scope of the subject invention. Thus, for instance, the number of warp yarns at positions 170 may be more in number than the number of yarns at positions 154, or there may be no warp yarns at warp positions 70 whatsoever. As illustrated, braid made in accordance with the subject invention is such that the left side configuration is symmetrical with respect to the right side configuration. This need not be the case and, alternatively, line 162 need not pass through the center of the braid or be vertical in orientation.

The present invention should not be limited to the details of the embodiments illustrated. Variations in numbers of yarns, in materials, and in structural details will suggest themselves to those skilled in the art. Basic to the invention is the concept of building into mechanical packing an increased capacity to resist undesired deformation, to avoid warp popping, and to avoid harmful loading effects. The invention should be limited only by the spirit and scope of the appended claims.

What is claimed is:

1. In braided mechanical compression packing of rectilinear cross-section having exterior "A," "A'" positions and interior "B" positions, the combination of a plurality of axial warp yarns placed in a predetermined non-symmetrical density pattern, and carrier yarns being braided about said warp yarns, whereby parallelism in opposite cross-sectional sides of said packing is maintained as said packing is wrapped about a cylindrical surface, said packing including warp yarns at positions other than the interior corners of the packing, thereby to provide against any of the warp yarns popping out of the braid and to provide said non-symmetrical pattern.

2. The combination of claim 1, wherein there are no warp yarns at the "A" positions, and warp yarns exist at the "B" positions.

3. The combination of claim 1, wherein at least two carrier yarns lie exterior of the inner corner warp yarns, thereby to prevent inner corner warp yarn popping.

4. In braided mechanical compression packing of rectilinear cross-section having exterior "A," "A'" positions and interior "B" positions, the combination of a plurality of axial warp yarns placed in a predetermined non-symmetrical density pattern, and carrier yarns being braided about said warp yarns, whereby parallelism in opposite cross-sectional sides of said packing is maintained as said packing is wrapped about a cylindrical surface, said density pattern varying throughout the body of said packing from most dense at the outside of said packing to least dense at the inside of said packing.

5. The combination of claim 4, wherein said density pattern is symmetrical about a vertical line through said packing.

6. The combination of claim 5, wherein said vertical line passes through the center of said packing.

* * * * *